United States Patent [19]
Schirmer

[11] 3,986,347
[45] Oct. 19, 1976

[54] COMBUSTOR PROCESS FOR LOW-LEVEL $NO_x$ AND CO EMISSIONS

[75] Inventor: Robert M. Schirmer, Bartlesville, Okla.

[73] Assignee: Phillips Petroleum Company, Bartlesville, Okla.

[22] Filed: Dec. 6, 1973

[21] Appl. No.: 422,316

[52] U.S. Cl. ............................... 60/39.02; 60/39.23; 60/39.29; 60/39.51 R; 60/39.65; 60/DIG. 11
[51] Int. Cl.² .................. F02C 3/00; F02C 7/10; F02C 9/14
[58] Field of Search ............. 60/39.02, 39.06, 39.65, 60/39.51 R, 39.51 H, DIG. 11, 39.29, 39.23

[56] References Cited
UNITED STATES PATENTS

| | | | |
|---|---|---|---|
| 3,693,347 | 9/1972 | Kydd et al. | 60/DIG. 11 |
| 3,705,492 | 12/1972 | Vickers | 60/39.65 |
| 3,742,702 | 7/1973 | Quinn | 60/39.65 |
| 3,780,528 | 12/1973 | Brandenburg | 60/39.29 X |
| 3,826,078 | 7/1974 | Quigg | 60/39.02 |

OTHER PUBLICATIONS

Wade et al., *Low Emissions Combustion for the Regenerative Gas Turbine*, ASME Paper No. 73-GT-11, Apr., 1973.
A. Ferri, "Better Marks on Pollution for the SST," Astronautics & Aeronautics, July 1972, p. 39.

*Primary Examiner*—Carlton R. Croyle
*Assistant Examiner*—Thomas I. Ross

[57] ABSTRACT

A new combustion process wherein combustion efficiency is retained while reducing inlet air temperature to the combustor so as to obtain both reduced nitrogen oxides emissions and reduced CO emissions. A new combination of combustion apparatus and heat utilization apparatus are also provided.

12 Claims, 10 Drawing Figures

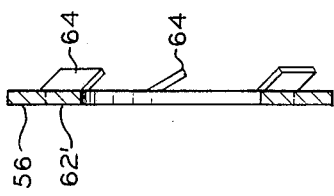
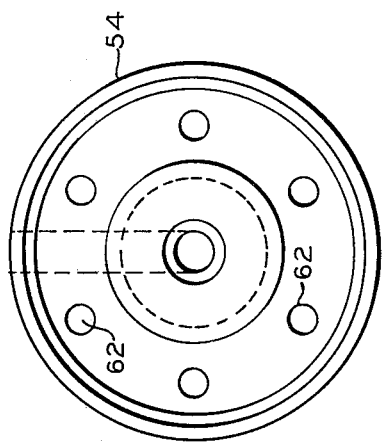
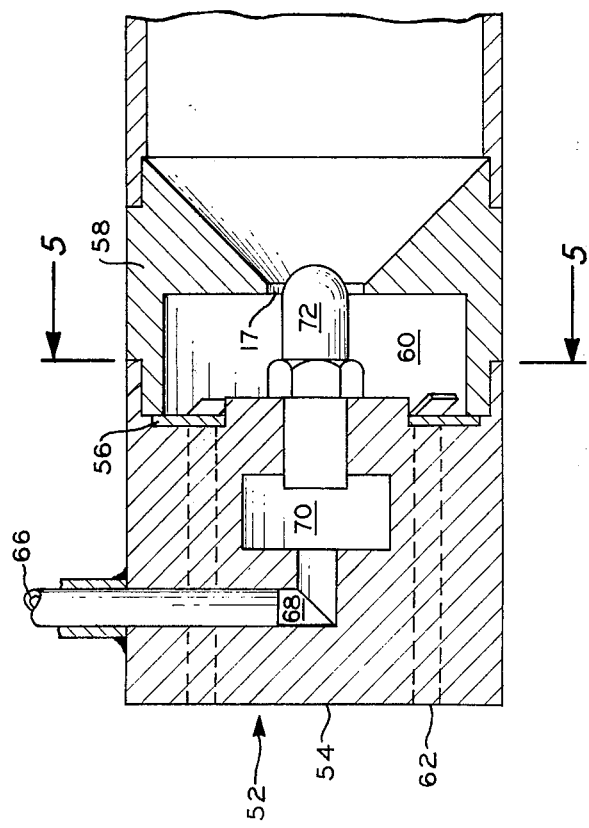

COMBUSTOR PROCESS FOR LOW-LEVEL $NO_x$ AND CO EMISSIONS

This invention relates to improved combustion processes and an improved combination of combustion apparatus and heat utilization apparatus.

Air pollution has become a major problem in the United States and other highly industrialized countries of the world. Consequently, the control and/or reduction of said pollution has become the object of major research and development effort by both governmental and nongovernmental agencies. Combustion of fossil fuel is a primary source of said pollution. It has been alleged, and there is supporting evidence, that the automobiles employing conventional piston-type engines burning hydrocarbon fuels are a major contributor to said pollution. Vehicle emission standards have been set by the United States Environmental Protection Agency (EPA) which are sufficiently restrictive to cause automobile manufacturers to consider employing alternate engines instead of the conventional piston engine.

The gas turbine engine is being given serious consideration as an alternate engine. CO emissions in conventional prior art gas turbine processes operated for maximum fuel combustion efficiency are not usually a problem. However, nitrogen oxides emissions, usually referred to as $NO_x$, are a problem because the high temperatures generated in such prior art processes favor the production of $NO_x$. It has been proposed to reduce the temperature of the inlet combustion air flowing to the combustion apparatus so as to reduce the amount of nitrogen oxides produced. For example, see the United States Patent to Vickers, U.S. Pat. No. 3,705,492, issued Dec. 12, 1972. However, there is no disclosure in said Vickers patent of what happens to the production of CO emissions. A gas turbine engine employed in an automobile or other vehicle will be operated over a wide range of varying operating conditions including idle, low speed, moderate speed, high speed, acceleration, and deceleration. These varying conditions also create serious problems in controlling $NO_x$ and CO emissions. Thus, there is a need for a combustion process, and/or a combustor of practical and/or realistic design, which can be operated in a manner such that the pollutant emissions therefrom will meet said EPA standards. Even a process, and/or a combustor, giving reduced pollutant emissions approaching said standards would be a great advance in the art. Such a process, or combustor, would have great potential value because it is possible the presently very restrictive EPA standards may be reduced.

In the operation of combustion processes, conservation of the thermal energy produced is essential for efficiency. For example, in many of the current gas turbine engines being proposed for automotive service, the turbine exhaust gases are heat exchanged with the inlet air to the primary combustion zone of the combustor so as to recover heat from said exhaust gases and improve overall efficiency. However, insofar as is presently known, few, if any, of these engines will meet the emission standards set by said Environmental Protection Agency, particularly over the wide range of varying operating conditions discussed above.

The present invention solves the above-described problems by heat-exchanging the turbine exhaust gases with another air stream to the combustor, e.g., the secondary air, and/or the dilution or quench air, instead of the primary inlet air. The method of the invention thus provides for reducing the temperature of only the primary inlet air to the combustor. This reduces the temperature in the primary combustion zone of the combustor which results in reduced nitrogen oxides emissions as discussed further hereinafter. Heating the secondary air results in reduced CO emissions as discussed further hereinafter. The method of the invention also provides for controlling the amount of low temperature primary inlet air to the combustor in accordance with the fuel flow to the combustor, or in accordance with the speed of the gasifier when the combustion gases are supplied to a turbine. Thus, the overall advantageous results of the invention include: (1) reduction of both nitrogen oxide emissions and CO emissions from the combustor; (2) maintaining thermal effiiciency by returning the recovered heat to the process at a point where it has no effect on nitrogen oxides production; and (3) accomplishing said results (1) and (2) over essentially the entire operating range of a variable speed gas turbine engine by controlling the amount of the low temperature primary inlet air introduced into the combustor in accordance with (a) the fuel flow to said combustor, or (b) the speed of the turbine. The invention also provides a novel combination of combustion apparatus and heat utilization apparatus.

Thus, according to the invention there is provided in a method for forming and burning a combustible mixture of a fuel and air in a combustion zone having a primary combustion region, a secondary combustion region located downstream from said primary combustion region, and a quench or dilution region located downstream from said secondary combustion region, to produce hot combustion gases containing heat energy which are passed to a heat energy utilization zone to utilize a portion of said heat energy, and wherein, a stream of air is divided into a first stream of air and a second stream of air, at least a portion of said first stream of air is introduced into said primary combustion region as the sole stream of primary combustion air introduced thereto, a stream of fuel is introduced into said primary combustion region, said second stream of air is passed in heat exchange relationship with an exhaust stream from said heat energy utilization zone to heat said second stream of air, and at least a portion of said heated second stream of air is passed into said quench or dilution region, the improvement comprising: controlling the rate of introduction of said first stream of air into said primary combustion region in accordance with the rate of introduction of said fuel into said primary combustion region so as to reduce the concentration of $NO_x$ pollutant in said exhaust stream; and introducing another portion of said heated second stream of air into said secondary combustion region at a rate relative to the rate of introduction of said first stream of air which is sufficient to reduce the concentration of CO pollutant in said exhaust stream but insufficient to effect an increase in said $NO_x$ pollutant concentration.

Further according to the invention, there is provided an apparatus for producing and utilizing heat energy, comprising, in combination: an air supply conduit; a combustion means for burning a fuel to produce hot combustion gases containing heat energy; a fuel inlet conduit means for introducing a fuel into said combustion means; a primary air conduit means connected to said air supply conduit and said combustion means for introducing a stream of air comprising primary combustion air into said combustion means; a heat exchange means; a quench air conduit means connected to said air supply conduit, said heat exchange means, and said combustion means for delivering a stream of air comprising quench air from said air supply conduit, through said heat exchange means, and into said combustion means; a heat energy utilization means for utilizing a portion of said heat energy; an effluent conduit means for passing said hot combustion gases from said combustion means to said heat energy utilization means; an exhaust conduit means connecting said heat energy utilization means and said heat exchange means for passing said hot combustion gases from said heat utilization means and into heat exchange relationship with said stream of quench air to heat said quench air and thereby utilize an additional portion of said heat energy; and control means operatively connected to said primary air conduit means and to said fuel inlet conduit means for controlling the rate of introduction of said primary combustion air into said combustion means in accordance with the rate of introduction of said fuel into said combustion means.

FIG. 4 is an enlarged view in cross section of the fuel and the air introduction means of FIG. 3.

FIG. 5 is a view taken along the line 5—5 of FIG. 4.

FIG. 6 is a view in side elevation of an element of the fuel and air introduction means illustrated in FIG. 4.

Figure 1:
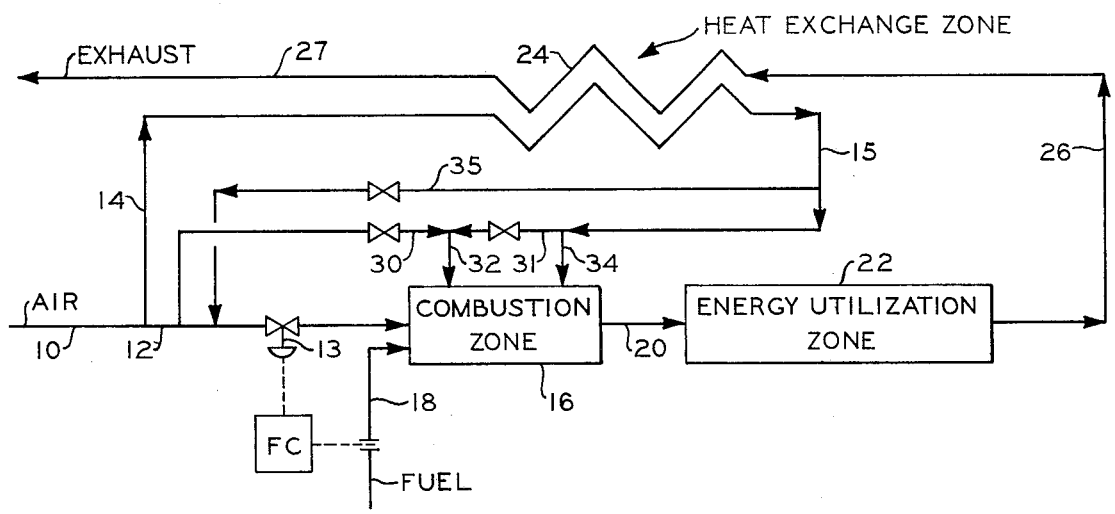
FIG. 1 is a diagrammatic flow sheet illustrating methods of producing and utilizing heat energy in accordance with the invention.

Referring now to the drawings, wherein like reference numerals are employed to denote like elements, the invention will be more fully explained. In FIG. 1 a stream of air from an air supply conduit 10 is divided into a first stream of air in conduit 12 and a second stream of air in conduit 14. In one embodiment, at least a portion of said first stream of air 12 is passed into combustion zone 16 as unheated primary combustion air. A stream of fuel is introduced into said combustion zone via conduit 18. Control valve 13 is provided to control the rate of flow of air in conduit 12 in accordance with the rate of flow of fuel in said fuel conduit 18. As shown in FIG. 1, the flow controller FC actuates valve 13 responsive to flow through the orifice in fuel conduit 18 to program an increase in air flow to accompany an increase in fuel flow, or vice versa. Said combustion zone can comprise any suitable type of combustion zone for burning a mixture of fuel and air to produce hot combustion gases containing heat energy. For example, said combustion zone 16 can be a combustor in a gas turbine engine, a combustor in an aircraft jet engine, a combustor or other furnace employed in a boiler for generating stream, or other types of stationary power plant, etc.

Said fuel and said first stream of air are at least partially mixed to form a combustible mixture which is burned to produce hot combustion gases containing heat energy. Said hot combustion gases are passed via conduit 20 to heat energy utilization zone 22 so as to utilize a portion of the heat energy in said gases. Said heat energy utilization zone can comprise any suitable method and/or means for utilizing or putting to use the heat energy contained in said hot combustion gases. For example, a turbine in a gas turbine engine wherein heat energy is converted to mechanical energy, or the heat exchange tubes in a boiler where water is converted to steam, etc.

Said second stream of air in conduit 14 is passed through heat exchange zone 24 in heat exchange relationship with an exhaust stream in conduit 26 from heat energy utilization zone 22 so as to heat said air and thereby utilize an additional portion of said heat energy. Said heat exchange zone can comprise any suitable method and/or means for effecting heat exchange between two separate streams of fluids, e.g., indirect heat exchange. The heated second stream of air is passed from said heat exchange zone via conduit 15 and returned to said combustion zone 16. One portion of said air in conduit 15 can be passed via conduits 31 and 32 to serve as heated secondary combustion air. Another portion of said air in conduit 15 can be passed via conduit 34 to serve as a diluent or quench medium to lower the temperature of the effluent gases in conduit 20 before they are passed to the heat energy utilization zone 22. If desired, a portion of said heated air in conduit 15 can be passed via conduit 35 into conduit 12 to regulate the temperature of the unheated air therein. The valve in conduit 35 can be employed for regulating the amount of heated air so used.

In one embodiment of the invention, said combustion zone 16 can comprise a primary combustion region, a secondary combustion region located downstream from said primary combustion region, and a quench or dilution region located downstream from said secondary combustion region. In this and other embodiments of the invention, said first stream of air in conduit 12 can be further divided into a stream comprising primary combustion air and another steam in conduit 30 which can comprise secondary combustion air. Said primary air is introduced into said primary combustion region. One portion of said heated second stream of air in conduit 15 can be passed via conduits 31 and 32 into said secondary combustion region. Another portion of said heated second stream of air can be introduced into said quench or dilution region via conduits 15 and 34.

In another embodiment of the invention, a portion of said unheated stream of air in conduit 30 can be passed, if desired, into conduit 32 for mixing with and decreasing the temperature of the secondary air therein should the temperature of the air in conduit 31 be greater than desired. The valves in said conduits 30 and 31 can be employed to regulate the relative proportions of the two streams of air.

Figure 2:
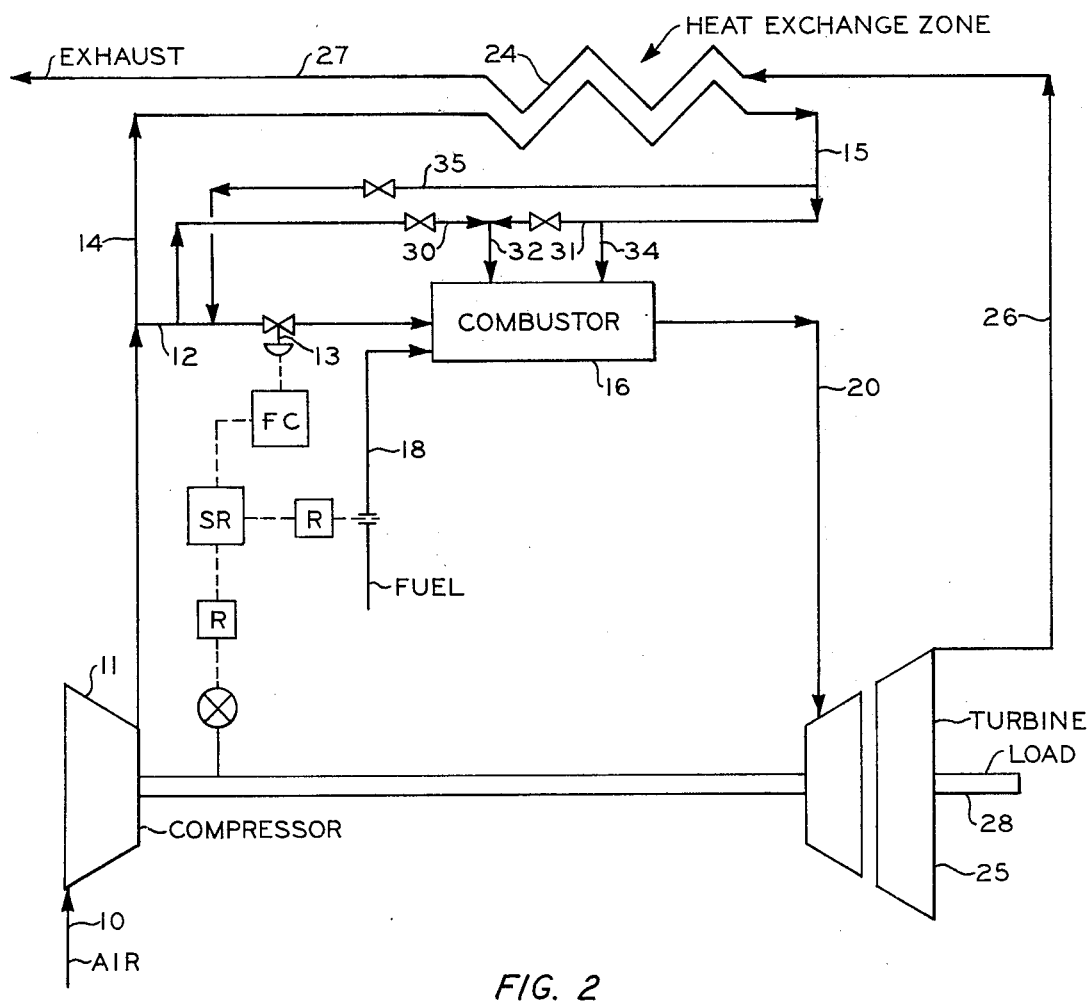
FIG. 2 is a diagrammmatic illustration of methods and apparatus in accordance with the invention.

FIG. 2 illustrates one embodiment of the invention wherein the effluent gases from combustor 16 are passed via conduit 20 to a turbine 25. In turbine 25 a portion of the heat energy in said gases is converted to mechanical energy to drive shaft 28 which can be connected to any suitable load. Exhaust gases from turbine 25 are passed via conduit 26 to heat exchanger 24 and exhausted therefrom via conduit 27. The various air flows to combustion zone 16 as described above in connection with FIG. 1 can also be employed in the apparatus illustrated in FIG. 2. If desired, the same means illustrated in FIG. 1 for controlling the rate of primary air flow to combustion zone 16 can also be employed in the apparatus of FIG. 2.

FIG. 2 also illustrates an alternate method and means of controlling the rate of air flow to combustor 16. In the control system there illustrated, (1) the fuel flow rate in conduit 18 can be employed to control the air flow rate in conduit 12, (2) the speed of the shaft connecting compressor 11 and the low stage of turbine 25 can also be employed to control said air flow rate, or (3) both fuel flow rate and shaft speed can be employed with selective relay SR selecting the high value of output from the fuel relay and the shaft speed relay.

The above described control systems of FIGS. 1 and 2, per se, form no part of the invention and the invention is not limited thereto. Any suitable control system can be used in the practice of the method of the invention.

Figure 3:
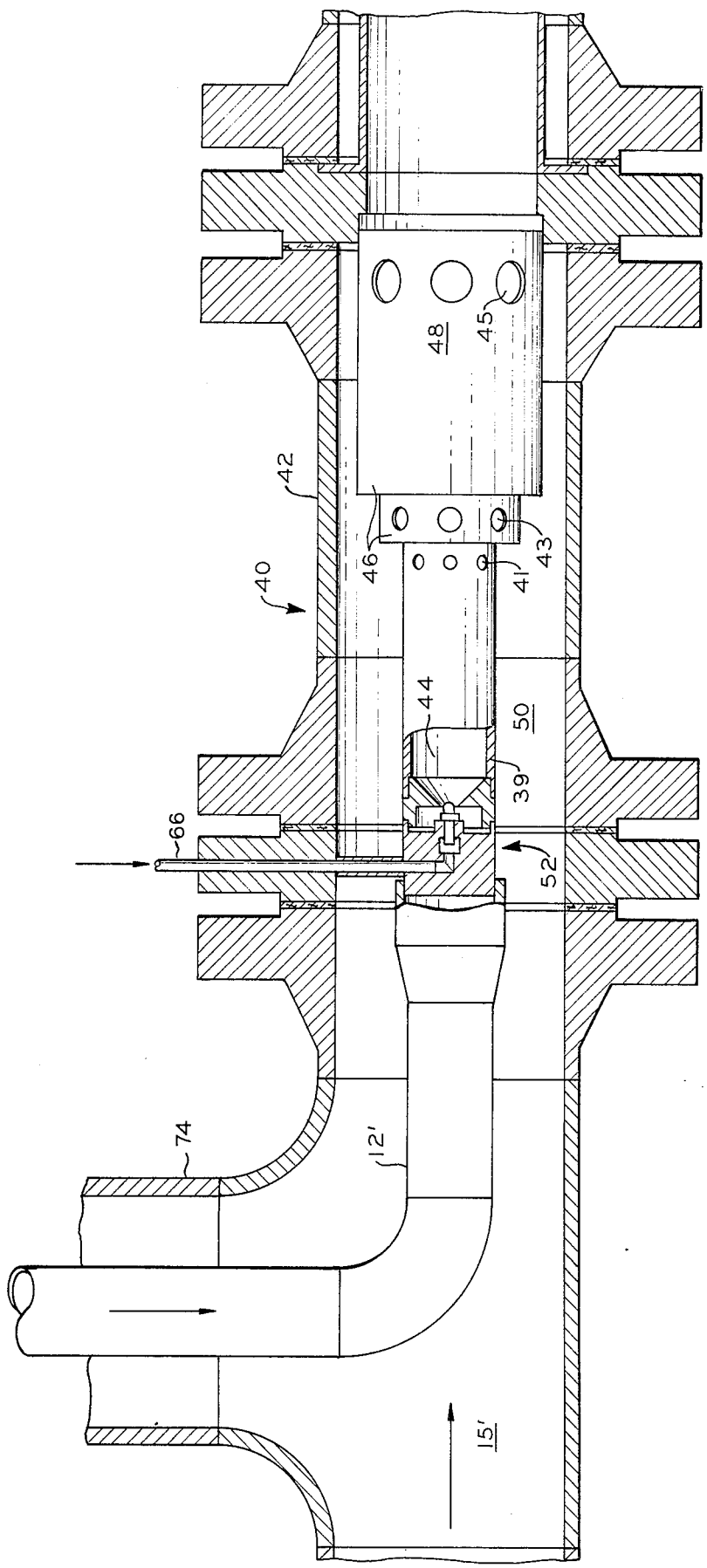
FIG. 3 is a view in cross section of one combustor which can be employed in the practice of the invention.

FIG. 3 illustrates one type of combustor, denoted generally by the reference numeral 40, which can be employed in carrying out the method of the invention. Said combustor comprises an outer housing or casing 42 having a flame tube 39 disposed concentrically therein. Said flame tube comprises a primary combustion region 44 disposed in the upstream end portion thereof, a secondary combustion region 46 located downstream from said primary combustion region, and a dilution or quench region 48 located downstream from said secondary combustion region. An annular chamber 50 is formed around said flame tube and between said flame tube and said outer housing 42. Said annular chamber 50 is closed at its downstream end by any suitable means such as that illustrated. The upstream end of said flame tube is closed by a dome or closure member designated generally by the reference numeral 52, and having fuel inlet means and primary combustion air inlet means incorporated therein. Primary air inlet conduit 12' is connected to the upstream end of dome or closure member 52 for admitting unheated primary combustion air thereto, e.g., from conduit 12 in FIG. 1, and into the primary combustion region of the flame tube. Although not shown in the drawing, the upper end of T-member 74 through which said conduit 12' extends is closed. The bottom portion 15' of said T-member comprises a portion of the conduit means for supplying heated air, e.g., from conduit 15 in FIG. 1, to annular chamber 50 for use as secondary air, and as dilution or quench air.

Referring to FIGS. 4, 5, and 6, said closure member 52 can be fabricated integrally, i.e., as one element. However, in most instances it will be preferred to fabricate said closure member in a plurality of pieces, e.g., an upstream element 54, a swirl plate 56 (see FIG. 6), and a downstream element or radiation shield 58. A primary air inlet means is provided for introducing a swirling mass of air into swirl chamber 60 which is formed between swirl plate 56 and radiation shield 58, and then into the upstream end of the flame tube. As illustrated in FIGS. 4, 5, and 6, said air inlet means comprises a plurality of air conduits 62 and 62' extending through said upstream member 54 and said swirl plate 56, respectively. A plurality of angularly disposed baffles 64, one for each of said air conduits 62, are formed on the downstream side of said swirl plate 56 adjacent the outlets of said air conduits.

A fuel inlet means is provided for introducing a stream of fuel into the upstream end of said flame tube. As illustrated in FIG. 4, said fuel inlet means comprises a fuel conduit 66 leading from a source of fuel, communicating with a passageway 68 formed in upstream element 54, which in turn communicates with chamber 70, also formed in element 54. A spray nozzle 72 is mounted in a suitable opening in the downstream side of said element 54 and is in communication with said chamber 70. Any other suitable type of spray nozzle and fuel inlet means can be employed, including other air assist atomization nozzles. For example, it is within the scope of the invention to employ other nozzle types for atomizing normally liquid fuels such as nozzles wherein a stream of air is passed through the nozzle along with the fuel.

At least one opening 41 is provided in the wall of flame tube 39 at a first station intermediate the ends of said flame tube for admitting heated secondary air into said flame tube. At least one opening 43 is provided in the wall of said flame tube at a second station, located downstream from but closely adjacent said first station, for admitting additional heated secondary air into said flame tube. The step or enlargement of the flame tube at said second station aids in mixing of the introduced secondary air with the combustion gases in the flame tube. At least one opening is provided in the wall of the flame tube at a third station located downstream from said second station. As illustrated in FIG. 3, it is usually preferred to provide a plurality of openings at said first, second, and third stations.

It will be understood the combustors described herein can be provided with any suitable type of ignition means and, if desired, means for introducing a pilot fuel to initiate burning.

Figure 7:
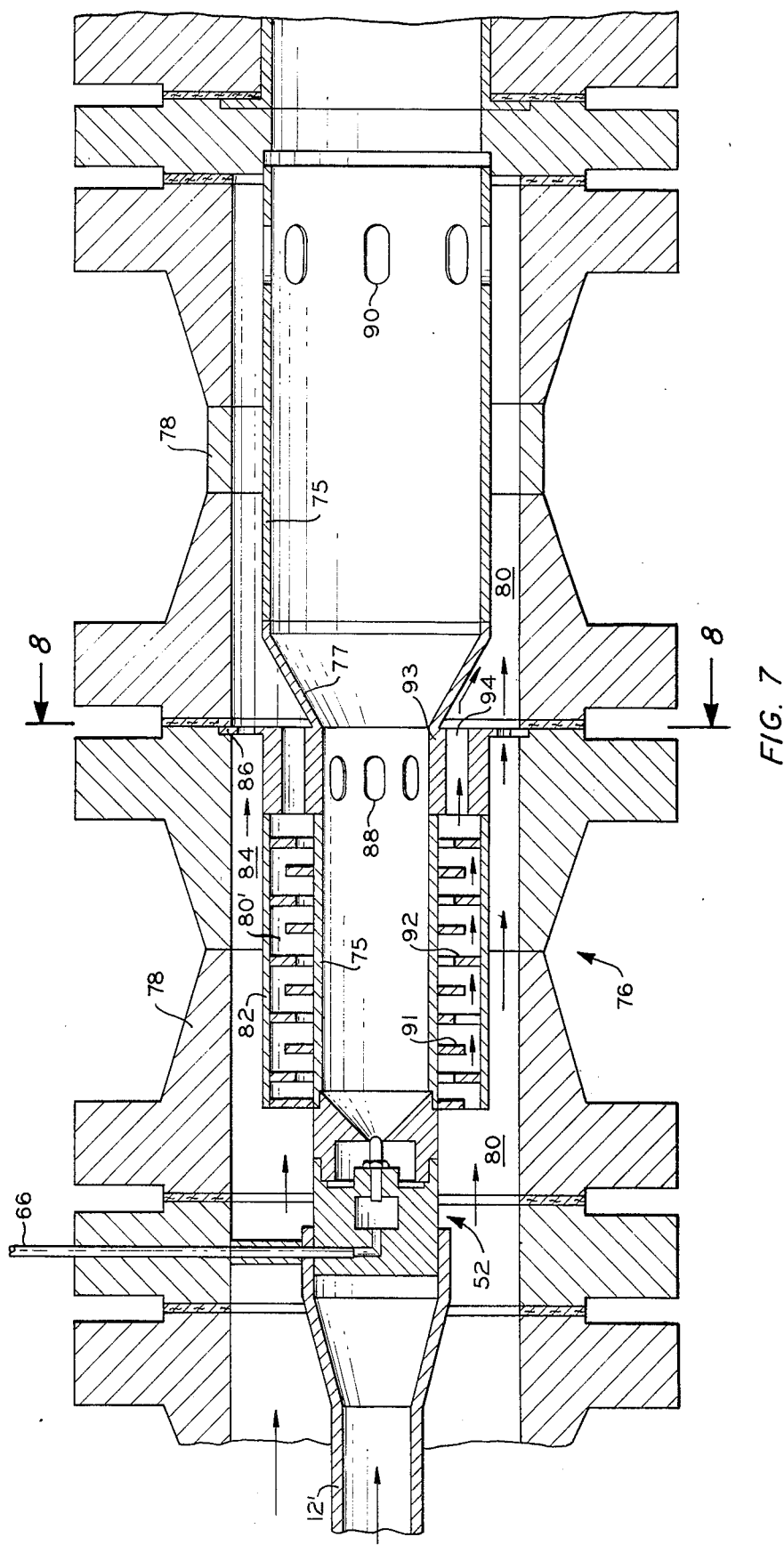
FIG. 7 is a view in cross section of another combustor which can be employed in the practice of the invention.

In FIG. 7 there is illustrated another combustor which can be employed in the practice of the invention, denoted generally by the reference numeral 76, which comprises an elongated flame tube 75 suitably mounted in an outer housing or casing 78. Said flame tube is open at its downstream end, as shown, for communication with a conduit leading to a turbine or other utilization of the combustion gases. A closure or dome member, designated generally by the reference numeral 52, is provided for closing the upstream end of said flame tube, except for the openings in said dome member. Said closure or dome member 52 is like that described above in connection with FIGS. 3, 4, 5, and 6, and includes air and fuel inlet means as there described. Said outer housing or casing 78 is disposed concentrically around said flame tube 75 and spaced apart therefrom to form a first annular chamber 80 around said flame tube and said dome or closure member 52. Said first annular chamber 80 is closed at its downstream end by any suitable means such as that illustrated. Suitable flange members, as illustrated, are provided at the downstream end of said flame tube 75 and outer housing 78 for mounting same and connecting same to a conduit leading to a turbine or other utilization of the combustion gases from the combustor. Similarly, suitable flange members are provided at the upstream end of said flame tube 75 and said outer housing for mounting same and connecting same to a suitable conduit means which leads from a suitable source of air, e.g., conduit 15 in FIG. 1. As illustrated in the drawing, said upstream flange members comprise a portion of said outer housing or casing 46 which encloses dome member 52 and forms the upstream end portion of said first annular chamber 80. While not shown in the drawing, it will be understood that suitable support members are employed for supporting said flame tube 75 and said closure member 52 in the outer housing 78 and said flange members. Said supporting members have been omitted so as to simplify the drawing.

Primary air inlet conduit 12' is connected to the upstream end of dome or closure member 52 for admitting unheated primary combustion air thereto, e.g., from conduit 12 in FIG. 1, and into the primary combustion region of the flame tube. Said conduit 12' can extend through a T-member 74, similarly as shown in FIG. 3, with the bottom portion of said T-member comprising a portion of conduit means for supplying heated air, e.g., from conduit 15 in FIG. 1, to annular chamber 80 for use as secondary air, and as secondary or dilution air.

An imperforate sleeve 82 surrounds an upstream portion of said flame tube 75. The outer wall of said sleeve can be insulated if desired and thus increase its effectiveness as a heat shield. Said sleeve 82 is spaced apart from flame tube 75 so as to longitudinally enclose an upstream portion 80' of said first annular chamber 80 and define a second annular chamber 84 between said sleeve 82 and outer casing 78. An annular wall member 86 is provided for at least partially closing the downstream end of said second annular chamber 84. As here illustrated, said wall member 86 is provided with a plurality of openings 87 therein for admitting a portion of the air stream in second annular chamber 84 into the downstream portion of first annular chamber 80. At least one opening 88 (see FIG. 8) is provided in the wall of the flame tube at a first station located intermediate the ends of said flame tube. In most instances, it will be preferred to provide a plurality of openings 88, as illustrated. A generally tubular conduit means 89 (see FIG. 8) extends from said second annular chamber 84 into communication with said opening 88 for admitting a second stream of air from said second annular chamber 84 into the interior of the flame tube. When a plurality of openings 88 are provided, a plurality of said tubular conduits 89 are also provided, with each individual conduit 89 being individually connected to an individual opening 88. The above-described structure thus provides an imperforate conduit means comprising second annular chamber 84 and tubular conduit(s) 89 for admitting a second stream of air into the interior of the flame tube.

At least one other opening 90 is provided in the wall of the flame tube at a second station located downwstream and spaced apart from said first station for admitting a third stream of air from first annular chamber 80 into the interior of the flame tube. In some instances, it will be preferred to provide a plurality of openings 90 spaced around the periphery of said flame tube, similarly as illustrated. A flared passageway 77 connects the upstream portion and the downstream portion of flame tube 75.

Figure 9:
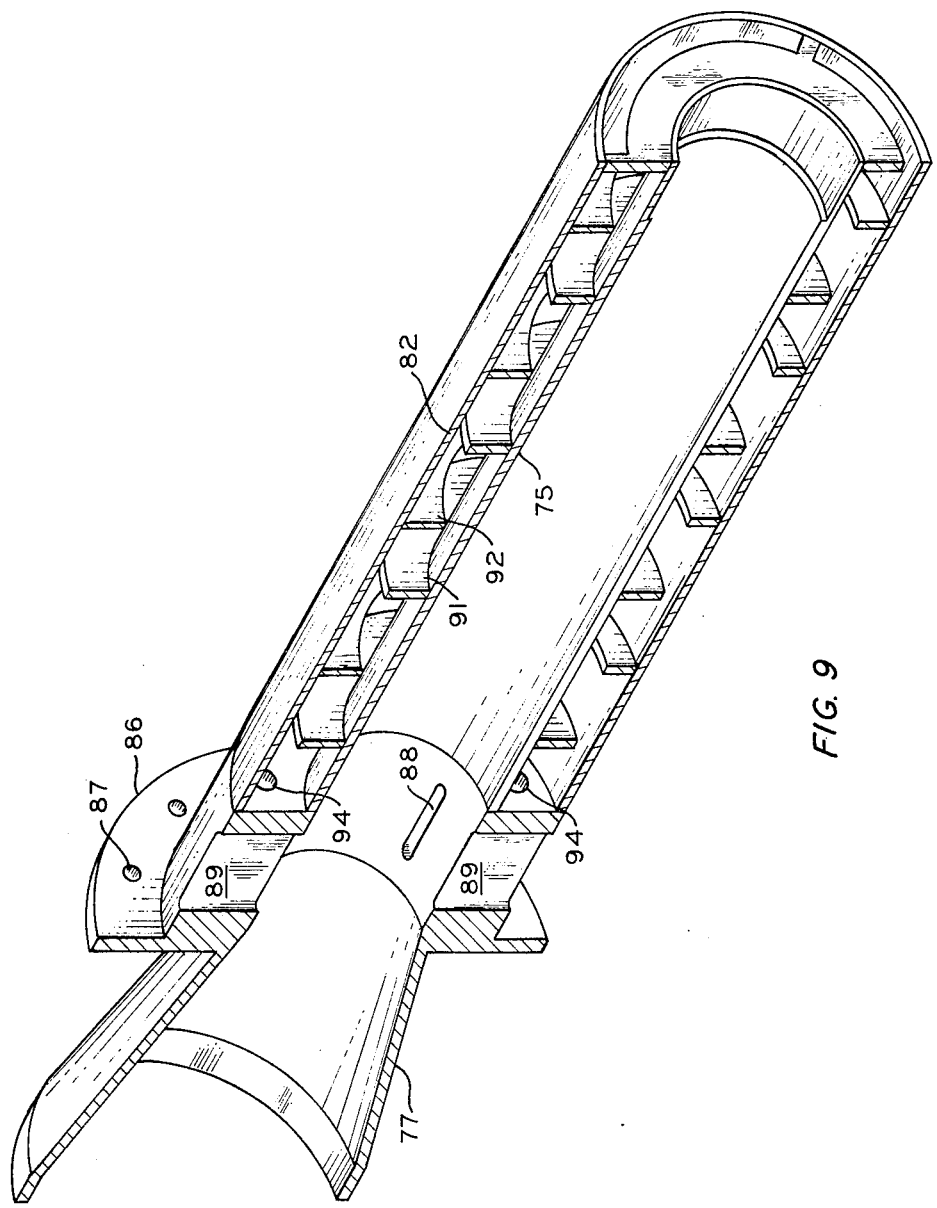
FIG. 9 is a perspective view of the upstream portion of the flame tube of the combustor of FIG. 7.

In the combustor illustrated in FIG. 7, the outer wall surface of the flame tube is provided with an extended surface in the form of fins or tabs 91 mounted thereon in the region surrounded by sleeve 82, and which extend into the portion 80' of said first annular chamber which is enclosed by said sleeve. As illustrated, said fins or tabs 91 alternate with similar fins or tabs 92 which extend from the inner surface of sleeve 82. See FIG. 9.

Figure 8:
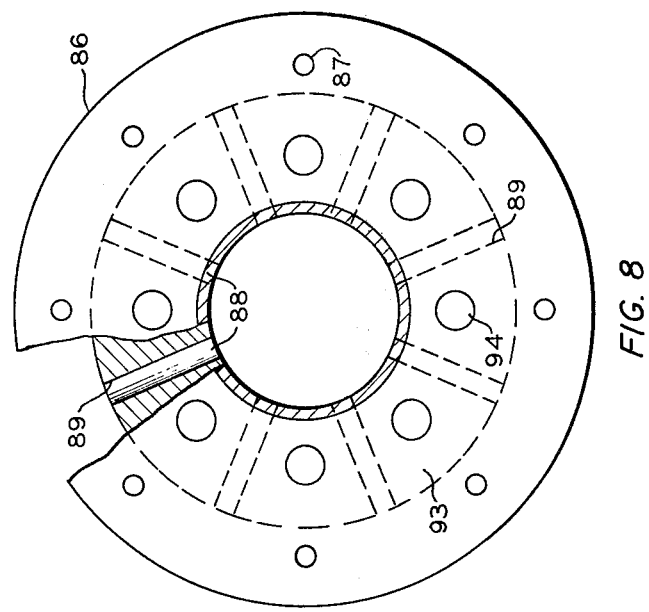
FIG. 8 is a view taken along the line 8—8 of FIG. 7.

FIG. 8 illustrates one type of structure which can be employed to provide tubular conduits 89. A boss member 93 is provided around the outer periphery of flame tube 75 at the downstream end of sleeve 82. Tubular conduits 89 are drilled through said boss member 93 to provide communication between annular chamber 84 and the interior of flame tube 75. Longitudinal passageways 94 are drilled through said boss member 93 to provide communication between enclosed annular chamber 80' and the downstream portion of first annular chamber 80.

Figure 10:
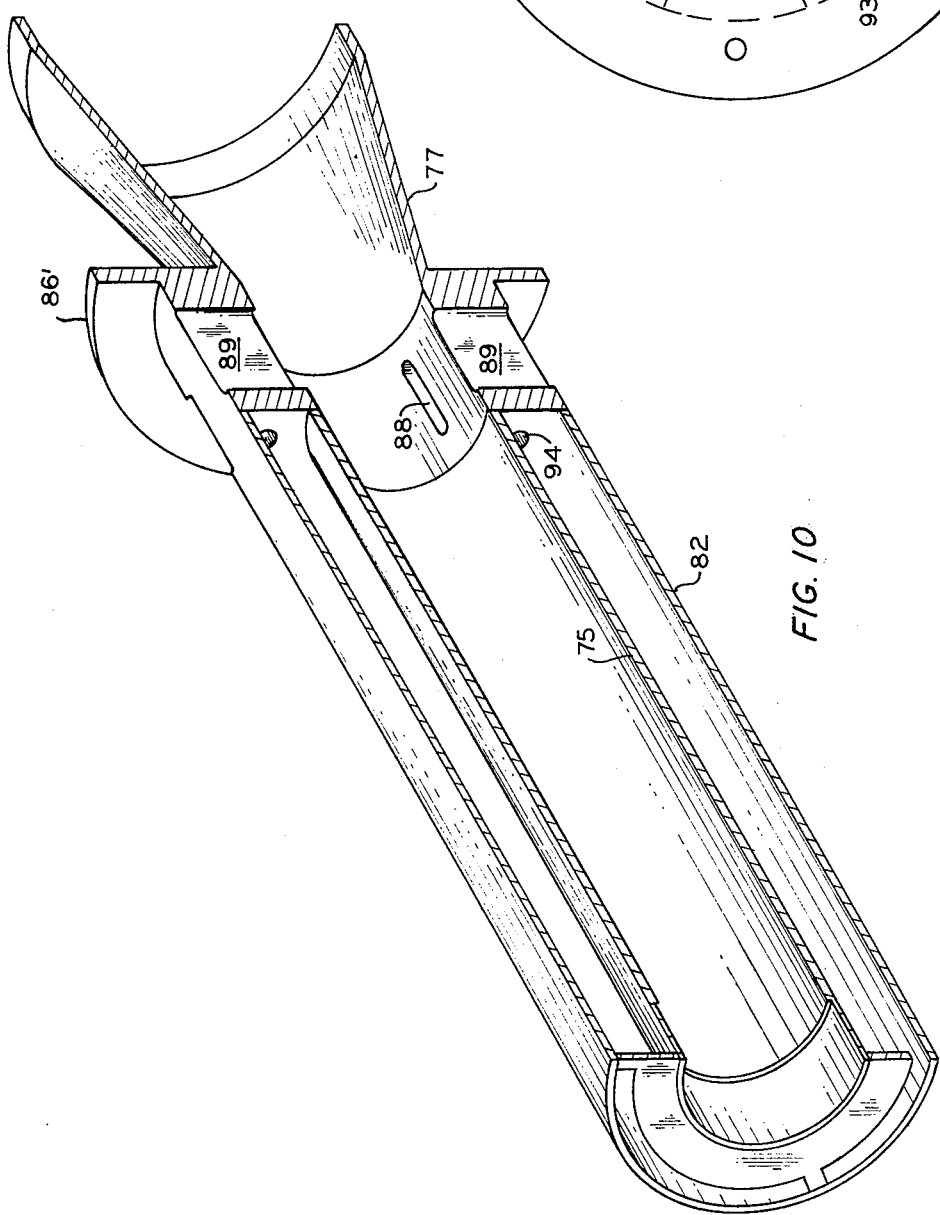
FIG. 10 is a perspective view, partially in cross section, of another flame tube which can be employed in the combustor of FIG. 7.

Referring now to FIG. 10, there is illustrated the upsteam portion of another flame tube 75 which can be employed in the combustor of FIG. 7. The downstream portion of said flame tube is like the downstream portion of the flame tube illustrated in FIG. 7. It will be noted that the fins 91 and 92 have been omitted from the flame tube illustrated in FIG. 10.

In a preferred method of operating the combustor of FIG. 3, a stream of air from a compressor or other source (not shown) is divided into a first stream of air and a second stream of air. Said first stream of air, e.g., from conduit 12 in FIGS. 1 or 2, is passed, via conduit 12', into the upstream end of the openings 62 in closure or dome member 52. See FIG. 4. Said first stream of air (unheated primary air) is passed by swirl plate 56, and into swirl chamber 60. The tabs or baffles 64 impart a helical or swirling motion to the air entering said swirl chamber and exiting therefrom. This swirling motion creates a strong vortex action resulting in a reverse circulation of hot gases within flame tube 39.

A steam of fuel is admitted, via conduit 66, chamber 70, and nozzle 72, axially of said swirling stream of air.

The above-mentioned second stream of air, after passing through a heat exchanger such as heat exchanger 24 in FIG. 1, enters the combustor via conduit 15' and is passed into the upstream end of annular chamber 50. Said heated stream of air is then passed through annular chamber 50 with a portion thereof being admitted via opening 41 into the interior of flame tube 39 as heated secondary air. Another portion of the air in annular chamber 50 is admitted via openings 43 into the interior of flame tube 39, also as heated secondary air. Another portion of the air in annular chamber 50 is admitted via openings 45 into the downstream end portion of flame tube 39 as dilution or quench air.

In one method of operating the combustor of FIG. 7, a steam of air from a compressor (not shown) is divided into a first stream of air and a second stream of air. Said first stream of air, e.g., from 12 in FIGS. 1 or 2, is passed via conduit 12' into the upstream end of the openings 62, by swirl plate 56, and into swirl chamber 60. The tabs or baffles 64 impart a helical or swirling motion to the air entering said swirl chamber and exiting therefrom. See FIG. 4. This swirling motion creates a strong vortex action resulting in a reverse circulation of hot gases within flame tube 12. Said first stream of air comprises and can be referred to as primary air.

A stream of fuel is admitted, via conduit 66, chamber 70, and nozzle 72, axially of said swirling stream of air.

The above-mentioned second stream of air, such as from heat exchanger 24, FIGS. 1 and 2, enters the combustor via a conduit like conduit 15' and is passed into the upstream end of first annular chamber 80 where it is divided into a stream comprising secondary air and a stream comprising dilution or quench air.

A major portion of said stream of air comprising secondary air is passed from the upstream end of first annular chamber 80 via second annular chamber 84, tubular conduits 89, and openings 88 into a second zone of the combustor which is located downstream from the primary combustion zone. A minor portion of the air stream in second annular chamber 24 passes through openings 87 and into the downstream end of first annular chamber 80.

Said stream of air comprising dilution or quench air is passed from the upstream end of first annular chamber 80, via the enclosed portion 80', through passageways 94, into the downstream portion of first annular chamber 80, and then via openings 90 into a third zone of the combustor which is located downstream from said second zone.

In the above methods of operation of the combustors of FIGS. 3 and 7, combustion of said fuel is initiated at least in said primary combustion zone with said first stream of air (primary air) and essentially completed in said second zone with said second stream of air. The resulting combustion gases are quenched in said third zone and the quenched gases exit the downstream end of the flame tube to a turbine or other utilization such as a furnace, boiler, etc.

In the above method of operation of the combustor of FIG. 7, said third stream of air in flowing through enclosed portion 80' removes heat from the wall of the primary combustion zone thus lowering its temperature, thereby increasing the heat loss from the combustion gases, and thereby lowering the flame temperature within the primary combustion zone. Preferably, the outer wall of the primary combustion zone is provided with an extended surface, e.g., fins as shown in FIG. 7, so as to increase said heat removal from the primary combustion zone. When openings 87 are not provided in boss member 86 all of the air stream flowing through second annular chamber 84 enters the flame tube via openings 88.

In the above described methods of operation the relative volumes of the various streams of air can be controlled by varying the sizes of the said openings, relative to each other, through which said streams of air are admitted to the flame tube of the combustor. Any other suitable method of controlling said air volumes can be employed. For example, flow meters or calibrated orifices can be employed in the conduits supplying said streams of air.

It is within the scope of the invention to operate the combustors or combustion zones employed in the practice of the invention under any conditions which will give the improved results of the invention. For example, it is within the scope of the invention to operate said combustors or combustion zones at pressures within the range of from about 1 to about 40 atmospheres, or higher; at flow velocities within the range of from about 1 to about 500 feet per second, or higher; and at heat input rates within the range of from about 30 to about 1200 Btu per pound of air. Since the invention provides for reducing the temperature of the primary combustion air to the combustor or combustion zone, to values less than those normally employed, so as to reduce nitrogen oxides emissions, it is preferred that the temperature of the inlet primary air be within the range of from ambient to about 700° F., more preferably from ambient to about 500° F. The temperature of the secondary air will be greater than the temperature of the primary air. The temperature of the secondary air should be at least about 200° F., preferably up to about 1000° F., or more, greater than the temperature of said primary air, depending upon the temperature of the primary air. Generally speaking, the upper limit of the temperature of the secondary air will be determined by the temperature of the air from the regenerator, e.g., heat exchanger 24 in FIGS. 1 and 2. However as mentioned above, the temperature of the heated secondary air, e.g., from conduits 15, 31, and 32 of FIGS. 1 and 2, can be "tempered," i.e., adjusted by mixing therewith a small amount of unheated air from conduit 30. The temperature of the dilution or quench air can be any suitable temperature depending upon materials of construction in the equipment employed downstream from the combustor, e.g., turbine blades, and how much it is desired to cool and/or dilute the combustor effluent. Generally speaking, operating conditions in the combustors employed in the practice of the invention will depend upon where the combustor is employed. For example, when the combustor is employed with a high pressure turbine, higher pressures and higher inlet air temperatures will be employed in the combustor. Thus, the invention is not limited to any particular operating conditions.

The relative volumes of the above-described primary, secondary, and quench or dilution air streams will depend upon the other operating conditions. Generally speaking, the volume of the primary air introduced into the primary combustion zone will be in the range of from 1 to 50, preferably 2 to 35, volume percent of the total air to the combustor when operating over a driving cycle including idling, low speed, moderate speed, high speed, acceleration, and deceleration. When operating under substantially "steady state" conditions, such as in a stationary power plant or in turnpike driving, the volume of said primary air will be in the range of from 1 to 35, preferably about 2 to 18, volume percent of the total air to the combustor. Under both said driving cycle conditions and said "steady state" conditions, the volume of the heated secondary air will be in the range of from 10 to 60, preferably 15 to 45 volume percent of the total air to the combustor. The volume of the dilution or quench air can be any suitable amount sufficient to accomplish its intended purpose.

While in most instances, said primary air, said secondary air, and said dilution or quench air will originate from one common soruce such as in FIGS. 1 and 2, it is within the scope of the invention for said streams of air to originate from different or separate sources. For example, the unheated primary air can be supplied from a source different from that of the secondary air and the dilution or quench air, e.g., a separate air pump or compressor. It is also within the scope of the invention for the heated secondary air to be supplied from a separate source. Separate heating means can be provided for heating said secondary air, if convenient.

The term "air" is employed generically herein and in the claims, for convenience, to include air and other combustion-supporting gases.

The following examples will serve to further illustrate the invention.

EXAMPLE I

A series of runs was made to evaluate the performance of 5 combustors (A, B, C, D, and E) over a broad range of operating conditions including test points within the ranges:

|                                    | Range          |
| ---------------------------------- | -------------- |
| Inlet Air Pressure, in Hg Abs.     | 50 to 130      |
| Inlet Air Temp (heated), °F.       | 800 to 1200    |
| Inlet Air Temp (unheated), °F.     | 200 to 400     |
| "By-Pass" Air, % of total air      | 0 to 10        |
| Reference Velocity, Ft/sec.        | 100 to 300     |
| Total Air Flow, lbs/sec            | 0.402 to 1.919 |
| Fuel flow, lbs/hr.                 | 3.88 to 125.65 |
| Heat Input, Btu/lb.air             | 50 to 350      |

Considering said five combustors as one combustor, runs were made at a total of 240 test points or conditions consisting essentially of various combinations of the above operating conditions. At each test point, the exhaust gas from the combustor was analyzed to determine the concentration of $NO_x$, CO, and unburned hydrocarbons (HC). From these raw data the Emission Index (pounds of pollutant produced per 1000 pounds of fuel burned) was calculated for $NO_x$, CO, and HC. Combustor A was like the combustor illustrated in FIGS. 3–6. Combustor B was a "control" combustor and was like combustor A except that conduit 12' for the introduction of unheated primary air to the primary combustion zone was omitted. Said combustor B was operated with heated air to the primary combustion zone. Combustors C, D, and E were like combustor A except for increased size of air opening 17 around fuel nozzle 72. See FIG. 4. Said opening was increased in combustors C, D, and E to 0.750, 0.875, and 1.000 inch diameter, respectively, to accommodate increased air flow without increasing pressure drop. Design details of combustor A are set forth in Table II below. Properties of the fuel used in said tests are set forth in Table I below.

Employing the data thus obtained, an empirical model or equation was developed which could be employed to describe combustor performance with respect to each pollutant over a range of operating conditions when using unheated air, e.g., air which had by-passed the regenerator or heat exchanger in FIG. 1, in the primary combustion zone of the combustor. This model, or equation, was determined by the statistically significant variable effects and interactions from the Analysis of Variance. Thus, said model, or equation, was an algebraic summary of the significant effects and interactions of the independent operating variables (pressure, temperature, velocity, heat input, and by-pass air) on each of the responses ($NO_x$ and CO). The levels of HC and smoke in the exhaust gases were so low that they were ignored in this analysis.

The thus obtained model or equation was then employed to calculate the exhaust emissions values of $NO_x$ and CO from a General Motors GT-309 automotive-turbine engine, having a combustor like combustor No. A incorporated therein. The operating conditions for said GT-309 engine which were employed in these calculations are given in Table III below. Calculated values for $NO_x$ and CO, from idle to maximum power conditions, are set forth in Table IV below.

Table V below sets forth selected values from Table IV and illustrates how the amount of bypass air to the primary combustion zone can be varied over the range of operating conditions to meet or approach various standards, e.g., the EPA standards or California standards.

EXAMPLE II

Another series of runs was made to evaluate the performance of combustor G, a 20 inch combustor. Combustor G had a configuration generally like that of combustor A employed in Example I above. The most significant difference was the combustor length. Design details of combustor G are set forth in Table II below. The fuel used was the same as in Example I. These runs were carried out over a broad range of operating conditions including test points within the following ranges:

|                                    | Range           |
| ---------------------------------- | --------------- |
| Inlet Air Pressure, in Hg Abs.     | 50 to 130       |
| Inlet Air Temp (heated), °F        | 900 to 1200     |
| Inlet Air Temp (unheated), °F      | 200 to 400      |
| "By-Pass" Air, % of total air,     | 2 to 14         |
| Reference Velocity, ft./sec.       | 160 to 230      |
| Total Air Flow, lbs./sec.          | 0.583 to 1.951  |
| Fuel Flow, lbs./hr                 | 10.12 to 74.97  |
| Heat Input, Btu/lb.air             | 50 to 250       |

Runs were made at a total of 107 test points or conditions consisting essentially of various combinations of the above operating conditions. The exhaust gases were analyzed and Emission Index values were calculated for the pollutants $NO_x$, CO, and HC, as described above in Example I. The thus obtained data were employed to develop an empirical model or equation with respect to each pollutant, similarly as described above in Example I. The thus obtained model or equation was then employed to calculate the exhaust emissions of $NO_x$ and CO from a GM GT-309 automotive turbine engine, having a combustor like combustor G incorporated therein, and employing the operating conditions given in Table III below.

Calculated values for $NO_x$ and CO, from idle to maximum power conditions, are set forth in Table IV below.

Table V below sets forth selected values from Table IV and illustrates how the amount of "bypass" air, e.g., unheated air which had bypassed the heat exchanger or regenerator in FIG. 1, to the primary combustion zone can be varied or controlled over the range of operating to minimize emissions of both $NO_x$ and CO.

EXAMPLE III

Another series of runs was made to evaluate the performance of combustor F, another 20 inch combustor. Combustor F was like the combustor illustrated in FIG. 7 of the drawings except that the fins were omitted from the flame tube as in FIG. 10 of the drawings. Design details of combustor F are given in Table II below. The fuel used was the same as in Examples I and II. These runs were carried out over a range of operating conditions including test points within the following ranges:

|                                    | Range           |
| ---------------------------------- | --------------- |
| Inlet Air Pressure, in Hg Abs.     | 130             |
| Inlet Air Temp (heated), °F        | 1050 to 1250    |
| Inlet Air Temp (unheated) °F       | 200 to 400      |
| "Bypass" Air, % of total air,      | 5               |
| Reference Velocity, ft/sec.        | 110 to 190      |
| Total Air Flow, lbs./sec.          | 1.042 to 1.919  |
| Fuel Flow, lbs./hr.                | 30.14 to 74.00  |
| Heat Input, Btu/lb. of air         | 100 to 250      |

Runs were made at a total of 18 test points or conditions consisting essentially of various combinations of the above operating conditions. The exhaust gases were analyzed and Emission Index values were calculated for the pollutants $NO_x$, CO, and HC, as described above in Example I. The thus obtained data, supplemented with data from test points at lower pressure operating conditions from the runs on combustor G, were then employed to develop an empirical model or equation with respect to the pollutants $NO_x$ and CO, similarly as described above in Example I. Said model or equation was then employed to calculate the exhaust emissions of $NO_x$ and CO from a GM GT-309 engine, similarly as described above in Examples I and II. The calculated values are set forth in Tables IV and V below.

TABLE I

PHYSICAL AND CHEMICAL PROPERTIES OF TEST FUEL

| | Philjet A-50 |
|---|---|
| ASTM Distillation, °F | |
| Initial Boiling Point | 340 |
| 5 vol % evaporated | 359 |
| 10 vol % evaporated | 362 |
| 20 vol % evaporated | 371 |
| 30 vol % evaporated | 376 |
| 40 vol % evaporated | 387 |
| 50 vol % evaporated | 398 |
| 60 vol % evaporated | 409 |
| 70 vol % evaporated | 424 |
| 80 vol % evaporated | 442 |
| 90 vol % evaporated | 461 |
| 95 vol % evaporated | 474 |
| End Point | 496 |
| Residue, vol % | 0.8 |
| Loss, vol % | 0.0 |
| Gravity, degrees API | 46.6 |
| Density, lbs/gal | 6.615 |
| Heat of Combustion, net, Btu/lb | 18,670 |
| Hydrogen Content, wt % | 14.2 |
| Smoke Point, mm | 27.2 |
| Sulfur, wt % | 0.001 |
| Gum, mg/100 ml | 0.0 |
| Composition, vol % | |
| Paraffins | 52.8 |
| Cycloparaffins | 34.5 |
| Olefins | 0.1 |
| Aromatics | 12.6 |
| Formula (calculated) | $(C_{11}H_{22})$ |
| Stoichiometric Fuel/Air Ratio, lb/lb | 0.0676 |

TABLE II

COMBUSTOR DESIGN

| Variable | Combustor A | Combustor F | Combustor G |
|---|---|---|---|
| Dome | | | |
| Air Inlet Type | Tangent | Tangent | Tangent |
| Hole Diameter, in. | 0.250 | 0.313 | 0.313 |
| Number of Holes | 6 | 6 | 6 |
| Total Hole Area, sq. in. | 0.295 | 0.460 | 0.460 |
| Fuel Nozzle Type | Simplex | Simplex | Simplex |
| Spray Angle, deg. | 45 | 45 | 45 |
| Radiation Shield Type | Orifice | Orifice | Orifice |
| Hole Diameter, in. | 0.625 | 0.750 | 0.875 |
| Nozzle Annulus Area, sq. in. | 0.157 | 0.292 | 0.451 |
| % Total Combustor Hole Area | 1.359 | 3.985 | 4.959 |
| Flame-Tube | | | |
| 1st Station Diameter, in. | 2.067 | 2.067 | 2.067 |
| Length from Fuel Inlet, in. | 3.000 | 7.250 | 6.250 |
| Hole Diameter, in. | 0.500 | 0.313×1 | 0.500 |
| Number of Holes | 8 | 8 | 8 |
| Total Hole Area, sq. in. | 1.570 | 2.500 | 1.570 |
| % Total Combustor Hole Area | 13.597 | 34.120 | 17.266 |
| 2nd Station Diameter, in. | 3.068 | 3.312* | 3.068 |
| Length from Fuel Inlet, in. | 4.000 | 8.000 | 7.250 |
| Hole Diameter, in. | 0.750 | 0.687 | 0.750 |
| Number of Holes | 8 | 8 | 8 |
| Total Hole Area, sq. in. | 3.536 | 2.965 | 3.536 |
| % Total Combustor Hole Area | 30.625 | 40.466 | 38.887 |
| 3rd Station Diameter, in. | 4.026 | 5.000* | 4.026 |
| Length from Fuel Inlet, in. | 10.000 | 8.000 | 18.000 |
| Hole Diameter, in. | 1.000 | 0.500 | 0.750 |
| Number of Holes | 8 | 8 | 8 |
| Total Hole Area, sq. in. | 6.283 | 1.570 | 3.536 |
| % Total Combustor Hole Area | 54.417 | 21.427 | 38.887 |
| 4th Station Diameter, in. | — | 4.026 | — |
| Length from Fuel Inlet, in. | — | 18.000 | — |
| Hole Diameter, in. | — | 0.75×1.75 | — |
| Number of Holes | — | 8 | — |
| Total Hole Area, sq. in. | — | 9.536 | — |
| % Total Combustor Hole Area | — | — | — |
| Combustor Length, in. | 11.875 | 20.875 | 20.875 |
| Primary Zone, in. | 4.000 | 7.250 | 7.250 |
| Secondary Zone, in. | 6.000 | 10.750 | 10.750 |
| Combustor Volume, cu.in. | 113.673 | 197.778 | 197.778 |
| Primary Zone, cu.in. | 13.422 | 24.331 | 24.331 |
| Secondary Zone, cu.in. | 76.382 | 136.848 | 136.848 |
| Combustor Hole Area, sq. in. | 11.546 | 7.327 | 9.093 |
| % Combustor Exit Area | 90.697 | 57.556 | 71.429 |

*Station Divider

TABLE III

COMBUSTOR OPERATING CONDITIONS FOR GM GT-309 REGENERATIVE GAS TURBINE ENGINE

| Test Point | Gasifier Speed, % | Inlet Air Pressure, in Hg abs | Inlet Air Temperature, from Regenerator °F | Air Flow, lb/sec | Reference Velocity, ft/sec(1) | Fuel Flow, lb/hr | Heat Input, But/lb Air |
|---|---|---|---|---|---|---|---|
| 1(2) | 50 idle | 43.2 | 964 | 1.37 | 200(3) | 13.5 | 51 |
| 2(2) | 60 | 50.8 | 903 | 1.78 | 200(3) | 22.6 | 65 |
| 3(2) | 70 | 62.3 | 1314 | 1.99 | 200(3) | 46.2 | 119 |
| 4(2) | 80 | 75.6 | 1233 | 2.48 | 200(3) | 69.1 | 143 |
| 5 | 90 | 92.1 | 1154 | 3.06 | 200(3) | 99.1 | 167 |
| 6 | 100 | 110.2 | 1091 | 3.66 | 200(3) | 131.9 | 185 |

Notes:
(1)Cold flow
(2)Points of concern in running vehicle on the Federal test cycle.
(3)Estimated values.

TABLE IV

EMISSIONS FROM COMBUSTORS AT OPERATING CONDITIONS FOR GENERAL MOTORS GT-309 AUTOMOTIVE TURBINE ENGINE

| Test Point | Gasifier Speed, % | Bypass Air*, % of Total Air 0 | | 2 | | 6 | | 10 | | 14 | |
|---|---|---|---|---|---|---|---|---|---|---|---|
| | | $NO_x$ | CO | $NO_x$ | CO | $NO_x$ | CO | $NO_x$ | CO | $NO_x$ | CO |
| Combustor No. A | | | | | | | | | | | |
| 1 | 50 | 2.5 | 61.6 | 2.1 | 70.5 | 1.4 | 95.3 | 1.0 | 128.7 | 0.7 | 173.9 |

TABLE IV-continued

EMISSIONS FROM COMBUSTORS AT OPERATING CONDITIONS FOR GENERAL MOTORS GT-309 AUTOMOTIVE TURBINE ENGINE

| Test Point | Gasifier Speed, % | Bypass Air*, % of Total Air | | | | | | | | |
|---|---|---|---|---|---|---|---|---|---|---|
| | | 0 | | 2 | | 6 | | 10 | | 14 |
| | | Emission Index, lbs Pollutant/1000 lbs Fuel | | | | | | | | |
| | | $NO_x$ | CO | $NO_x$ | CO | $NO_x$ | CO | $NO_x$ | CO | $NO_x$ | CO |
| 2 | 60 | 2.5 | 57.2 | 2.1 | 65.5 | 1.5 | 88.5 | 1.0 | 119.5 | 0.7 | 161.5 |
| 3 | 70 | 5.9 | 7.8 | 5.1 | 8.9 | 3.6 | 12.1 | 2.6 | 16.3 | 1.8 | 22.1 |
| 4 | 80 | 6.5 | 5.5 | 5.6 | 6.3 | 4.0 | 8.5 | 2.9 | 11.5 | 2.1 | 15.6 |
| 5 | 90 | 7.2 | 4.1 | 6.3 | 4.7 | 4.6 | 6.4 | 3.3 | 8.7 | 2.4 | 11.7 |
| 6 | 100 | 8.1 | 3.4 | 7.1 | 3.9 | 5.2 | 5.3 | 3.8 | 7.2 | 2.8 | 9.7 |
| Combustor No. F | | | | | | | | | | | |
| 1 | 50 | 5.1 | 6.3 | 4.5 | 6.6 | 3.8 | 7.2 | 3.5 | 7.9 | 3.7 | 8.6 |
| 2 | 100 | 4.1 | 6.0 | 3.7 | 6.2 | 3.0 | 6.7 | 2.8 | 7.2 | 2.9 | 7.7 |
| 3 | 70 | 5.3 | 1.7 | 4.6 | 1.8 | 3.7 | 2.2 | 3.3 | 2.7 | 3.3 | 3.2 |
| 4 | 80 | 4.9 | 1.6 | 4.2 | 1.7 | 3.3 | 2.0 | 2.9 | 2.3 | 2.8 | 2.8 |
| 5 | 90 | 5.1 | 1.5 | 4.4 | 1.6 | 3.4 | 1.9 | 2.9 | 2.2 | 2.8 | 2.5 |
| 6 | 100 | 5.8 | 1.6 | 4.9 | 1.7 | 3.8 | 1.9 | 3.2 | 2.1 | 3.0 | 2.4 |
| Combustor No. G | | | | | | | | | | | |
| 1 | 50 | 5.7 | 168.4 | 5.0 | 188.4 | 4.1 | 241.9 | 3.8 | 310.6 | 4.0 | 398.7 |
| 2 | 60 | 4.5 | 146.5 | 4.0 | 160.6 | 3.2 | 197.1 | 3.0 | 241.8 | 3.1 | 296.7 |
| 3 | 70 | 5.9 | 4.4 | 5.1 | 5.5 | 4.0 | 9.1 | 3.5 | 15.2 | 3.5 | 25.3 |
| 4 | 80 | 5.4 | 3.5 | 4.7 | 4.3 | 3.6 | 6.8 | 3.1 | 10.7 | 3.0 | 16.7 |
| 5 | 90 | 5.6 | 3.2 | 4.8 | 3.9 | 3.6 | 5.7 | 3.1 | 8.4 | 3.0 | 12.4 |
| 6 | 100 | 6.5 | 3.5 | 5.5 | 4.1 | 4.1 | 5.8 | 3.4 | 8.1 | 3.2 | 11.5 |

*Unheated air to Primary Combustion Zone

TABLE V

MINIMUM EMISSIONS FROM COMBUSTORS AT OPERATING CONDITIONS FOR GENERAL MOTORS GT-309 AUTOMOTIVE TURBINE ENGINE

| Test Point | Gasifier Speed, % | Combustor No. A | | | Combustor No. F | | | Combustor No. G | | |
|---|---|---|---|---|---|---|---|---|---|---|
| | | Bypass Air**, % | Emission Index, | | Bypass Air**, % | Emission Index, | | Bypass Air**, % | Emission Index, | |
| | | | $NO_x$ | CO | | $NO_x$ | CO | | $NO_x$ | CO |
| 1975-76 EPA Goal | | | 1.4 | 12 | | 1.4 | 12 | | 1.4 | 12 |
| 1* | 50 | 6 | 1.4 | 95 | 10 | 3.5 | 8 | 10 | 3.8 | 311 |
| 2* | 60 | 7 | 1.4 | 96 | 10 | 2.8 | 7 | 10 | 3.0 | 242 |
| 3* | 70 | 14 | 1.8 | 22 | 12 | 3.2 | 3 | 10 | 3.5 | 15 |
| 4* | 80 | 14 | 2.1 | 16 | 12 | 2.8 | 3 | 14 | 3.0 | 17 |
| 5 | 90 | 14 | 2.4 | 12 | 14 | 2.8 | 3 | 14 | 3.0 | 12 |
| 6 | 100 | 14 | 2.8 | 10 | 14 | 3.0 | 2 | 14 | 3.2 | 12 |
| 1975-76 Calif. Std. | | | 3.5 | 42 | | 3.5 | 42 | | 3.5 | 42 |
| 1* | 50 | 0 | 2.5 | 62 | 10 | 3.5 | 8 | 10 | 3.8 | 311 |
| 2* | 60 | 0 | 2.5 | 57 | 10 | 2.8 | 7 | 5 | 3.4 | 179 |
| 3* | 70 | 7 | 3.3 | 13 | 12 | 3.2 | 3 | 10 | 3.5 | 15 |
| 4* | 80 | 8 | 3.5 | 10 | 12 | 2.8 | 3 | 7 | 3.5 | 8 |
| 5 | 90 | 10 | 3.3 | 9 | 14 | 2.8 | 3 | 7 | 3.5 | 5 |
| 6 | 100 | 11 | 3.5 | 8 | 14 | 3.0 | 2 | 10 | 3.4 | 8 |

*Points of concern in running vehicle on the Federal test cycle.
**Unheated air to Primary Combustion Zone.

Referring to the above Table IV, the data there set forth show that at all levels of operation (gasifier speed) the $NO_x$ emissions decreased with increasing amounts of unheated air introduced into the primary combustion zone of the combustor. However, said data also show that CO emissions increased with increasing amounts of unheated air introduced into the primary combustion zone of the combustor. Thus, said data show that one cannot just use increasing amounts of unheated air to the primary combustion zone in order to obtain reduced $NO_x$ emissions, one must also take into consideration the production of CO emissions. In accordance with the methods of the invention, this is accomplished by using variable amounts of unheated air in the primary combustion zone, with said amounts being varied in accordance with at least one of (a) the rate of fuel flow to the combustor and/or (b) the gasifier speed.

For example, referring to Table V, the data show that the amount of bypass air flow (unheated air to the primary combustion zone) can be adjusted to minimize emissions from the combustors. In the practice of the invention one selects an amount of bypass air which will give $NO_x$ emission values which will meet or approach the desired $NO_x$ emission level without producing excessive CO emissions. The bypass airflow is then programmed on control to vary in accordance with changes in fuel flow so as to maintain optimum stoichiometry in both the primary combustion zone and the secondary combustion zone of the combustor, and thus minimize both $NO_x$ and CO emissions.

The temperature of the heated air admitted to the secondary combustion zone of the combustor is an important operating variable or parameter when lower primary air inlet temperatures are used, and it is desired to obtain low CO emission values as well as low $NO_x$ values. The temperatures in the primary combustion zone and the secondary combustion zone of the combustor enter into the overall stoichiometry in said zones.

Thus, while it is not intended to limit the invention by any theories as to the reaction mechanisms involved therein, it is presently believed that the primary combustion zone should be operated at flame gas temperatures below about 3000° F. so as to eliminate, or at least minimize, the formation of $NO_x$. However, cooling to temperatures in the order of less than 2500° F., or lower, should be avoided because the rate of CO oxidation is drastically reduced. Thus, when excessive amounts of low temperature primary air are introduced into the primary combustion zone of the combustor, it is believed that the excessive low temperature air so "dilutes" or cools the gases in the secondary combustion zone to lower their temperature below about 2500° F. and measurably slow the oxidation of CO to $CO_2$. In the practice of the invention this condition is avoided, or minimized, by (1) controlling the rate of introduction of the low temperature primary air in accordance with the rate of fuel introduction, and (2) introducing heated secondary air at a rate and at a temperature which are sufficient to reduce the concentration of CO in the exhaust stream but insufficient to effect an increase in $NO_x$ concentration.

The Emission Index values referred to herein were related to the various governmental agencies standards by assuming that the vehicle in which the gas turbine engine is employed will obtain a fuel economy of 10.0 miles per gallon of fuel, and a fuel weight of 6.352 pounds per gallon.

No adjustment has been made for the relatively dry inlet air used in the test runs (about 0.002 lbs. $H_2O$ per pound of dry air). Therefore, a correction factor in the order of about 0.76 could be applied to the $NO_x$ values reported herein.

Thus, while certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:
1. In a method for forming and burning a combustible mixture of a fuel and air in a combustion zone having a primary combustion region, a secondary combustion region located downstream from said primary combustion region, and a quench or dilution region located downstream from said secondary combustion region, to produce hot combustion gases containing heat energy which are passed to a heat energy utilization zone to utilize a portion of said heat energy, and wherein,
there are established a first stream of air and a second stream of air,
at least a portion of said first stream of air is introduced into said primary combustion region as the sole stream of primary combustion air introduced thereto,
a stream of fuel is introduced into said primary combustion region,
said second stream of air is passed in heat exchange relationship with an exhaust stream from said heat energy utilization zone to heat said second stream of air, and at least a portion of said heated second stream of air is passed into said quench or dilution region, the improvement comprising:
introducing said at least a portion of said first stream of air into said primary combustion region at a temperature within the range of from ambient to about 700° F. and at a controlled rate, and adjusting said rate in accordance with the rate of introduction of said fuel to be sufficient, when said fuel is burned, to provide in said primary combustion region a combustion gas temperature within the range of from about 2500° to about 3000° F at which the rate of formation of $NO_x$ is reduced and at which the rate of oxidation of CO to $CO_2$ is not substantially reduced; and
introducing another portion of said heated second stream of air into said secondary combustion region at a temperature greater than the temperature of said first stream of air and at a rate which are sufficient to provide in said secondary combustion region a combustion gas temperature at which the concentration of CO pollutant in the combustion gases in said secondary combustion region is reduced and at which the concentration of said $NO_x$ pollutant is not increased.

2. A method according to claim 1 wherein:
said first stream of air is divided into a stream comprising primary air and another stream comprising secondary air;
said primary air is introduced into said primary combustion region as said controlled first stream of air; and
at least a portion of said secondary air is mixed with said another portion of said heated second stream of air to adjust the temperature thereof and the resulting mixture is introduced into said secondary combustion region.

3. A method according to claim 1 wherein:
said controlled first stream of air is introduced into said primary combustion region in an amount within the range of from 1 to 50 volume percent of the total air introduced into said combustion zone; and
said another portion of said heated second stream of air is introduced into said secondary combustion region in an amount within the range of from 10 to 60 volume percent of the total air introduced into said combustion zone.

4. A method according to claim 3 wherein:
said controlled first stream of air is introduced into said primary combustion region in an amount within the range of from 1 to 35 volume percent of the total air introduced into said combustion zone.

5. A method according to claim 1 wherein:
said controlled first stream of air is introduced into said primary combustion region in an amount within the range of from 2 to 35 volume percent of the total air introduced into said combustion zone; and
said another portion of said heated second stream of air is introduced into said secondary combustion region in an amount within the range of from 15 to 45 volume percent of the total air introduced into said combustion zone.

6. A method according to claim 5 wherein:
said first stream of air is introduced into said primary combustion region in an amount within the range of from 2 to 18 volume percent of the total air introduced into said combustion zone.

7. A method according to claim 1 wherein the temperature of said another portion of said heated second stream of air is at least 200° F. greater than the temperature of said controlled first stream of air.

8. A method according to claim 1 wherein the temperature of said another portion of said heated second stream of air is up to at least 1000° F. greater than the temperature of said controlled first stream of air.

9. A method according to claim 8 wherein:
said controlled first stream of air is introduced into said primary combustion region in an amount within the range of from 2 to 18 volume percent of the total air introduced into said combustion zone; and
said another portion of said heated second stream of air is introduced into said secondary combustion region in an amount within the range of from 15 to 45 volume percent of the total air introduced into said combustion zone.

10. A method according to claim 1 wherein said combustion gas temperature in said secondary combustion region is not less than about 2500° F., but is below about 3000° F.

11. In a method for forming and burning a combustible mixture of a fuel and air in a combustion zone having a primary combustion region, a secondary combustion region located downstream from said primary combustion region, and a quench or dilution region located downstream from said secondary combustion region, to produce hot combustion gases containing heat energy which are passed to a heat energy utilization zone comprising a turbine to utilize a portion of said heat energy, and wherein,
there are established a first stream of air and a second stream of air,
at least a portion of said first stream of air is introduced into said primary combustion region as the sole stream of primary combustion air introduced thereto,
a stream of fuel is introduced into said primary combustion region,
said second stream of air is passed in heat exchange relationship with an exhaust stream from said heat energy utilization zone to heat said second stream of air, and at least a portion of said heated second stream of air is passed into said quench or dilution region, the improvement comprising:
introducing said at least a portion of said first stream of air into said primary combustion region at a temperature within the range of from ambient to about 700° F. and at a controlled rate, and adjusting said rate in accordance with (a) the rate of introduction of said fuel and (b) the speed of said turbine to be sufficient, when said fuel is burned, to provide in said primary combustion region a combustion gas temperature within the range of from about 2500° to about 3000° F. at which the rate of formation of $NO_x$ is reduced and at which the rate of oxidation of CO to $CO_2$ is not substantially reduced; and
introducing another portion of said heated second stream of air into said secondary combustion region at a temperature greater than the temperature of said first stream of air and at a rate which are sufficient to provide in said secondary combustion region a combustion gas temperature at which the concentration of CO pollutant in the combustion gases in said secondary combustion region is reduced and at which the concentration of said $NO_x$ pollutant is not increased.

12. In a method for forming and burning a combustible mixture of a fuel and air in a combustion zone having a primary combustion region, a secondary combustion region located downstream from said primary combustion region, and a quench or dilution region located downstream from said secondary combustion region, to produce hot combustion gases containing heat energy which are passed to a heat energy utilization zone comprising a turbine to utilize a portion of said heat energy, and wherein,
there are established a first stream of air and a second stream of air,
at least a portion of said first stream of air is introduced into said primary combustion region as the sole stream of primary combustion air introduced thereto,
a stream of fuel is introduced into said primary combustion region,
said second stream of air is passed in heat exchange relationship with an exhaust stream from said heat energy utilization zone to heat said second stream of air, and at least a portion of said heated second stream of air is passed into said quench or dilution region, the improvement comprising:
introducing said at least a portion of said first stream of air into said primary combustion region at a temperature within the range of from ambient to about 700° F. and at a controlled rate, and adjusting said rate in accordance with the speed of said turbine to be sufficient, when said fuel is burned, to provide in said primary combustion region a combustion gas temperature within the range of from about 2500° to about 3000° F. at which the rate of formation of $NO_x$ is reduced and at which the rate of oxidation of CO to $CO_2$ is not substantially reduced; and
introducing another portion of said heated second stream of air into said secondary combustion region at a temperature greater than the temperature of said first stream of air and at a rate which are sufficient to provide in said secondary combustion region a combustion gas temperature at which the concentration of CO pollutant in the combustion gases in said secondary combustion region is reduced and at which the concentration of said $NO_x$ pollutant is not increased.

* * * * *